(12) United States Patent
Kaiser et al.

(10) Patent No.: US 6,448,317 B1
(45) Date of Patent: Sep. 10, 2002

(54) DUAL FUNCTION GELLED MASTIC ADHESIVE AND GELLED MASTIC ADHESIVE MORTAR

(76) Inventors: Conard E. Kaiser, 5817 Centralcrest, Houston, TX (US) 77092; Jock R. Collins, 5817 Centralcrest, Houston, TX (US) 77092; James R. Collins, 5817 Centralcrest, Houston, TX (US) 77092

(*) Notice: Subject to any disclaimer, the term of this patent is extended or adjusted under 35 U.S.C. 154(b) by 147 days.

(21) Appl. No.: 09/668,783

(22) Filed: Sep. 22, 2000

Related U.S. Application Data

(63) Continuation-in-part of application No. 09/307,502, filed on May 7, 1999, now Pat. No. 6,201,050.
(60) Provisional application No. 60/155,329, filed on Sep. 22, 1999.

(51) Int. Cl.[7] .............................. C08K 5/16; C08K 5/17; C08L 33/02
(52) U.S. Cl. ...................... 524/239; 524/249; 524/247; 524/556; 106/505; 106/823
(58) Field of Search .............................. 524/556, 247, 524/249, 239; 106/505, 823

(56) References Cited

FOREIGN PATENT DOCUMENTS

JP         58017157 A  *  2/1993  ................. 524/239

* cited by examiner

Primary Examiner—David W. Wu
Assistant Examiner—Kelechi C. Egwim
(74) Attorney, Agent, or Firm—Kenneth A. Roddy

(57) ABSTRACT

An organic, easy to use, dual function adhesive in the form of a single package ready-to-use stabilized gelled mastic adhesive which prevents the separation and settling of components, for use in the installation of ceramic tile as an ordinary mastic adhesive when used as furnished for ceiling and wall tiles and, when Portland powdered cement is added, becomes a high strength latex modified dry-set mortar because of the unique breakable gel properties of the mastic adhesive. The gelled mastic adhesive is usable as the water component for dry-set mortar because, on the addition of portland cement, the gel will break and become a free-flowing liquid with additives thereby allowing precise quantitation and easy mixing to produce a homogeneous dry-set mortar with the strength and water resistance of a latex modified Portland cement based composition and also functions as a waterproofing and crack suppressing membrane adhesive.

20 Claims, No Drawings

DUAL FUNCTION GELLED MASTIC ADHESIVE AND GELLED MASTIC ADHESIVE MORTAR

CROSS REFERENCE TO RELATED APPLICATIONS

This application is a Continuation-In-Part of U.S. patent application Ser. No. 09/307,502, filed May 7, 1999, now U.S. Pat. No. 6,201,050, which is hereby incorporated by reference to the same extent as if fully set forth herein. This application claims priority of U.S. Provisional Application Serial No. 60/155,329 filed Sep. 22, 1999.

BACKGROUND OF THE INVENTION

1. Field of the Invention

This invention relates generally to gelled adhesives, tile adhesives and dry-set mortars and methods for their formulation, and more particularly to a dual function gelled mastic adhesive which can be used "as is" for the installation of wall and ceiling tile, and can be mixed with a Portland cement powder to form a powerful latex-modified dry-set mortar having the added utility of a crack suppressive adhesive and functioning as a waterproofing membrane.

2. Brief Description of the Prior Art

Takahashi et al, Japan patent JP 58017157A discloses a transparent gel that is prepared by using a highly water-absorbing synthetic resin (e.g. modified polysodium acrylate) as a gelling agent and adding to the gel at least one additive selected from among ethylenediamine-tetraacetic acid (or its disodium salt), triisopropanolamine, ethanolamine, n-propyl gellate, nickel dibutyldithiocarbamate, phenyl-alpha-naphthylamine and benzophenone derivative in an amount of 5 wt % or less, to prevent lowering of viscosity caused by sunlight, etc.

Bowden, U.S. Pat. No. 4,204,876 discloses a method of using thixotrophic compositions to carry additives in the liquid portion of cementitious products as a method of attempting to gain homogeneity of the end product.

Johansen et al, U.S. Pat. No. 5,558,708 discloses a "two-component" system and method for dispensing pigment in cement based composition using a predetermined and prepackaged amount of an aqueous liquid pigment carrier component that is mixed with a predetermined and prepackaged amount of a powder cement component to obtain standardized colors. Although this system has merit it does not solve the problem of color and additive variance within batches because the pigments and additives commonly, and usually very rapidly, settle out of the liquid leaving a virtually clear liquid at the top and a concentration of additives and pigments at the bottom of the container. Vigorous stirring, shaking, or otherwise mixing of the pigment carrier component after storage and prior to combining with the powdered materials is required. Relatively large quantities of suspension enhancing agents are required that serve no other purpose. These agents mask, dilute, change, or otherwise compromise the final composition. Additionally, products with large quantities of suspending agents must be sold in small containers to facilitate shaking by the end user.

Johansen et al, U.S. Pat. No. 5,846,315 disclose a method for preparing a pigment dispersing pigment cement composition comprising water, pigment, a suspension enhancing agent and latex polymer solids. Two or more prepackaged compositions of an aqueous liquid pigment component is mixed with a prepackaged amount of a dry powder cement component to obtain cement composition with a uniform and standardized color. The suspension control agents, viscosity control agents, etc., two or more of which are required, are thoroughly mixed together prior to combining with the prepackaged dry powder cement. Agents that merely increase the viscosity of the aqueous component sufficient to carry the desired additives preclude their use in water in calciferous materials.

Johansen et al, U.S. Pat. No. 5,855,665 disclose a system and method for producing pigmented cement compositions that use significant percentages of only marginally effective suspension enhancing agents. Vigorous shaking, stirring, or otherwise mixing is still required which also limits container size to that which can be conveniently handled by workmen. Furthermore, the significant concentrations of suspension enhancing agents and dispersants required in the aqueous coloring composition can be deleterious to the makeup and strength of the end product. Additionally, the setting aids required are essential because the products also contain chemicals that compromise setting. These materials can also be detrimental to the ultimate strength of the final mix. This system also requires the mixing of additional water into the prepackaged pigmented cement compositions.

Mastics are sticky adhesives that are composed of bonding agents and carriers. The carrier may be water as in latex-based mastic adhesives or may be solvents as in petroleum based mastics. The petroleum-based mastics are now being used far less frequently because of the release of volatile organic compounds into the air and the environmental restrictions associated therewith. Mastics cure by the evaporation or absorption of the carrier which requires special considerations when installing impervious tile on backing that may limit carrier loss. The mastic adhesives can "skin over" around the margins of each tile thus preventing the loss of the carrier by evaporation and the mastic may virtually never set thereby causing weak bonds and job failures.

Dry-set mortars are Portland cement compositions that adhere by a chemical reaction between the Portland cement and water and therefore no evaporation is necessary or desired for hardening or "setting" to take place. In fact, they will "set" under water. These mortars are commonly referred to as "thinset" or "dry-set" mortars. Though somewhat accurate, the terms are commonly used interchangeably. Dry-set mortar is defined in the American National Standards Institute (ANSI) Specifications 118. 1, C-2.1 as a water-retentive Portland cement mortar, which eliminates the necessity of soaking either the tile or the backing surfaces prior to installation. Dry-set mortars have a much higher bond and compressive strength than mastic adhesives. Thus, tile installed with mortars are less likely to pop off, are more resistant to impact, and can support more weight than those installed with mastic adhesives. These are the primary reasons that mastic adhesives are reserved for wall and ceiling tile installation.

Upon the addition of water to dry Portland cement, tricalcium silicate rapidly reacts to release calcium ions, hydroxyl ions, and a large amount of heat. Heat is evolved with cement hydration. This is due to the making and breaking of chemical bonds during hydration. The reaction continues producing calcium and hydroxyl ions until the system becomes saturated. Once this occurs, the calcium hydroxide begins to crystallize. Simultaneously calcium silicate hydrate begins to form. Ions precipitate out of solution accelerating the reaction of tricalcium to calcium and hydroxide ions (Le Chatlier's principle).

The formation of the calcium hydroxide and calcium silicate hydrate crystals provide "seeds" upon which more calcium hydrate can form. The calcium silicate hydrate crystals grow thicker and interlock each other making it more difficult for water molecules to reach the tricalcium silicate not yet hydrated. The speed of the reaction is now controlled by the rate at which water molecules diffuse through the calcium silicate hydrate.

Only calcium silicates add to the strength of Portland cement. Tricalcium silicate is responsible for most of the early strength (first 7 days). Dicalcium silicate, which reacts more slowly, contributes only to the strength at later times. The other major components, tricalcium aluminate and tetracalcium aluminoferrite do not contribute significantly to the strength of the end product. The only contribution of tetracalcium aluminoferrite is to lend the gray color to cement (if it is removed, white Portland cement results).

Every component must be hydrated and the rate of hydration of any one is affected by the varying concentration of the others. The rates of hydration of the most important components of Portland cement, in the first few days, from fastest to slowest, are: (1) tricalcium aluminate, (2) tricalcium silicate, (3) tetracalcium aluminoferrite, and (4) dicalcium silicate. The importance of complete hydration of all components of Portland cement can therefore easily be seen.

Components of Portland cement that do not contribute significantly to the strength of the final product do hydrate and tie up water before the major strength components are hydrated and the strength of the finished product is thereby established. Clays, binders and other additives used only for suspension of additives contribute to the lack of strength of cement by physically interfering with calcium silicate hydrate crystal formation. If present, they will also interfere with water movement and the process of hydration of the important strength producing components of Portland cement so that its setting can be significantly delayed and the final product weakened. The cement to water ratio is the most critical factor in the production of a "perfect" cement product. Water not consumed in the hydration reaction will remain in the microstructure pore spaces. These pores make the cement product weaker due to the lack of strength forming calcium silicate hydrate bonds.

To enable this process to progress to its completion, water must be available to allow the hydration of the tricalcium silicate and dicalcium silicate. Because the unglazed surface of glazed tile is hydroscopic it extracts water from any available source, and when thin layers of mortar are applied to the back of such tile, so much water is extracted so rapidly that the cascade of events that must take place for the setting of the cement is nearly impossible and the tile installation will fail. Formulations using water-retaining cellulose hold water in the mortar until the tricalcium silicates and dicalcium silicates hydrate, and the strength of the bond is established. The resulting interlocking calcium silicate hydrate crystals "grow" together and into the microscopic terrain variations of both the unglazed tile back and the backing surfaces.

If extreme care is not taken in formulation, the cement matrix of a Portland cement mortar can suffer excessive retardation of "set" due to its inability to extract the water needed for hydration from the cellulose. It is vital to choose the correct type, viscosity, and amount of cellulose material. Failure can still occur unless it is distributed evenly in the end product.

In formulating mastics, latex is used to promote adhesion to various substrates. Latex and cellulose additives will foam in the manufacturing process; therefore defoamers are necessary to control air entrainment in manufacturing. Air entrainment in cementitious mortars will cause a "false set" (the mortar getting crumbly while being troweled). Avoiding air entrainment is far more important in mortars than mastic adhesives.

Agents used for suspending additives in mastic adhesives or mortars that serve no purpose other than to keep the desired additives from separating out will weaken the end product by their very presence. Multiple-use products, such as methylcellulose, are used for thickening and water retention in mastics. If used in excessive amounts, these products will prevent the mastic adhesives from drying and the bond between the tile and the substrate will be weak.

Additionally, additives that serve no purpose other than to aid in the suspension of components in the aqueous portion when added to Portland cement will interfere with the proper set of the resulting mortar by interfering with the crystallization of the calcium silicates. Because of the inefficiency of most such suspension agents, they are often used in significant quantities. Also any material other than water and the proper sand, when added to Portland cement, will compromise the strength of the end product. Limiting the quantity of additives therefore is imperative.

The agents used for suspending additives in mastics or mortars can also greatly affect workability of the end products. For instance, since the average clay particle size is near one micron, when clays are used, the tiny particles act much like ball bearings thus increasing slippage of tile installed on vertical surfaces. Some products use 10 to 60% or more of suspension agents in an attempt to prevent separation and to obtain homogeneity in their products.

The present invention overcomes the problems discussed above, and is distinguished over the prior art in general, by a dual function homogeneous breakable gelled mastic adhesive which can be used "as is" for the installation of wall and ceiling tile, and can be mixed with a Portland cement powder to form a powerful latex-modified dry-set mortar having the added utility of a crack suppressive adhesive and functioning as a waterproofing membrane. The stabilized gelled mastic adhesive prevents the separation and settling of components, and when Portland powdered cement is added, becomes a high strength latex modified dry-set mortar because of the breakable gel properties of the mastic adhesive. The gelled mastic adhesive is usable as the water component for dry-set mortar because, on the addition of Portland cement, the gel will break and become a free-flowing liquid with additives thereby allowing precise quantitation and easy mixing to produce a homogeneous dry-set mortar with the strength and water resistance of a latex modified Portland cement based composition and also functions as a waterproofing and crack suppressing membrane adhesive.

The present invention virtually eliminates carriers that serve only to suspend additives in the mastic, thus, the workability of the mastic adhesives and mortar that results from mixing the gelled adhesive mastic of this invention with Portland cement is greatly enhanced. The amount of suspension or thickening agents in the present invention are far less than 2% of the total mixture. Therefore desired products can be added in significantly higher quantities without an overall increase of additives thus avoiding compromising strength of the end product. Without competition from unnecessary suspension enhancing agents and thickeners such as clay and carbonates, the cellulose derivatives, in the present invention are more efficiently assimilated and hydrated therefore greatly limiting and minimizing quantities required. For the same reason their efficiency to completely hydrate calcium silicates is increased.

Prior to the present invention, combining ordinary conventional mastic adhesives with a Portland cement product was impossible because the conventional mastic adhesives have a very high viscosity in excess of 600,000 centipoise. The high viscosity of conventional mastic adhesives makes it impossible to add more filler. Because the present gelled mastic becomes fluid when a filler such as Portland cement is added, the addition of more Portland cement will give a resultant viscosity sufficient to function as a dry-set mortar thereby supplying the necessary free water for the Portland cement to use in the hydration process and giving the strength expected of a dry-set mortar. Due to the even distribution of water in the matrix, gel-based mastic adhesives of the present invention impart homogeneous water availability, thereby making the necessary water available for the hydration process of the added Portland cement which imparts the required strength to the resultant tile adhesive bond.

SUMMARY OF THE INVENTION

It is therefore an object of the present invention to provide a gelled mastic adhesive that is ready to use "as-is" when taken from the shipping container and does not require mixing or stirring prior to use.

It is another object of this invention to provide a gelled mastic adhesive that has greater workability and ease of use than conventional mastic adhesives and has creamy no-slip characteristics, abundant open-time, and excellent tack time with no preparation.

Another object of this invention is to provide a gelled mastic adhesive that has a long shelf life and is exceptionally resistant to drying and setting in the shipping container if it is not completely resealed after partial use.

Another object of this invention is to provide a gelled mastic adhesive that can be sold, shipped and stored in large volume containers because it does not have to be shaken, stirred, agitated, or have the contents of the container otherwise mixed prior to use.

Another object of this invention is to provide an easily measured homogeneous non-separating breakable gelled mastic that becomes liquid upon contact with Portland cement type products for easy mixing therewith.

Another object of this invention is to provide a dual function homogeneous breakable gelled mastic adhesive including selected additives which can be mixed with Portland cement to produce an easily mixed homogeneous dry-set mortar, and serves as the source of all liquids required and thereby eliminating further additions of any liquids when mixing.

Another object of this invention is to provide a gelled mastic adhesive that allows the use of much smaller quantities of useful additives in mastic adhesives and mortars because their effects will not be masked or compromised by suspension additives that serve no useful purpose in the end product.

A further object of this invention is to provide a gelled mastic adhesive and a dry-set mortar that does not contain slippery clays and other additives that are used only as suspension agents and thereby increases the smoothness and workability of both the mastic adhesive and dry-set mortar and also provides for the proper setting of the resultant dry-set mortar by greatly increasing the relative amount of water present for the hydration process.

A still further object of this invention is to provide a dual function gelled mastic adhesive that is suitable for use in installing ceiling and wall tile and can also be mixed with Portland cement to produce a consistent homogeneous dry-set mortar that meets all of the ANSI standards and that is suitable for use in installing tile on floors and countertops.

Other objects of the invention will become apparent from time to time throughout the specification and claims as hereinafter related.

The above noted objects and other objects of the invention are accomplished by a dual function homogeneous breakable gelled mastic adhesive which can be used "as is" for the installation of wall and ceiling tile, and can be mixed with a Portland cement powder to form a powerful latex-modified dry-set mortar having the added utility of a crack suppressive adhesive and functioning as a waterproofing membrane. The stabilized gelled mastic adhesive prevents the separation and settling of components, and when Portland powdered cement is added, becomes a high strength latex modified dry-set mortar because of the breakable gel properties of the mastic adhesive. The gelled mastic adhesive is usable as the water component for dry-set mortar because, on the addition of portland cement, the gel will break and become a free-flowing liquid with additives thereby allowing precise quantitation and easy mixing to produce a homogeneous dry-set mortar with the strength and water resistance of a latex modified Portland cement based composition and also functions as a waterproofing and crack suppressing membrane adhesive.

DESCRIPTION OF THE PREFERRED EMBODIMENTS

The present invention is significant improvement in the field of adhesives used in the installation of ceramic tile. Organic adhesives used to install ceramic tiles on walls and ceilings must meet or exceed the ANSI A136.1 standards. Dry-set Portland cement mortar must meet ANSI A118.1 standards. The present invention addresses both applications by providing for a dual function gelled mastic adhesive that exceeds ANSI A136.1 standards for wall and ceiling installations, both Types I and II, and yet, upon the addition of approximately equal parts of Portland cement, exceeds the ANSI A118.1 standards for dry-set mortars. The ability of the high viscosity gelled mastic adhesive to receive the powered Portland cement powder is facilitated by the breaking of the gel into a liquid. The addition of more cementitious powder with additional mixing brings the paste to trowelable consistency like that of traditional dry-set mortars.

In producing the present gelled mastic adhesive, a gelling agent such as a cross-linked polyacrylic acid is mixed with water, which significantly lowers the pH of the water. The resultant free-flowing liquid state allows the addition of the desired additives to formulate an organic adhesive to the liquid, which is of a water consistency. Mixing or stirring using moderate continuous shear forces will completely and easily disperse the other required additives so that the final product is uniform. When the liquid is uniformly mixed and all additives are evenly dispersed, with continuous mixing, a neutralizing agent or alkaline electrolyte is added sufficient to adjust the pH so that a smooth gelled mastic adhesive is produced.

GELLED MASTIC ADHESIVE PREPARATION

EXAMPLE 1

Basic Gelled Mastic Adhesive

In one example of producing a preferred basic gelled mastic adhesive, approximately 3 parts (or about 0.001% to about 15.0% by weight) of a cellulose thickener is added to each approximately 490 parts (or about 50% to about 98% by weight) of water (aqueous carrier) and mixed thoroughly in a ribbon blender. When complete mixing has been achieved, approximately 10.5 parts (or about 0.01% to about 15.0% by weight) of a gelling agent such as a cross-linked polyacrylic acid is added and mixed thoroughly. Then approximately 400 parts (or about 75.0% by weight) of a highly tackafied latex, such as butadiene rubber latex, is added and mixed thoroughly. After thorough mixing approximately 12 parts (or about 0.001% to about 15.0% by weight) of a neutralizing agent or alkaline electrolyte such as triethanolamine, a mixture of sodium hydroxide and water, or a dilute mixture of an amine component, is added and mixed until a smooth homogeneous gel results. Optionally, approximately 1 part (or about 0.0001% to about 10.0% by weight) of an anti-microbial agent suitable for use with the latex and other compounds may be added and thoroughly mixed prior to adding the neutralizing agent.

In the second example described below, the formulation for the gelled mastic adhesive includes anti-foaming agents, anti-microbial agents, preservatives, and other additives.

EXAMPLE 2

Gelled Mastic Adhesive

In this example of a preferred gelled mastic adhesive, approximately 3 parts (or about 0.001% to about 15.0% by weight) of a cellulose thickener is added to each approximately 490 parts (or about 50% to about 98% by weight) of water (aqueous carrier) and mixed thoroughly in a ribbon blender. When complete mixing has been achieved, approximately 10.5 parts (or about 0.01% to about 15.0% by weight) of a cross-linked polyacrylic acid is added and mixed thoroughly. Then approximately 3.6 parts (or about 0.001% to about 0.5% by weight) of an antifoaming agent and approximately 6.5 parts (or about 0.002% to about 1% weight) of propylene glycol are added while mixing thoroughly between additions. Then approximately 400 parts (or about 75.0% by weight) of a highly tackafied latex, such as butadiene rubber latex, is added and mixed thoroughly, followed by approximately 1 to 3 parts (or about 0.0005% to about 0.5% by weight) of a fungicide preservative specially designed for cellulose and latex products. Approximately 1 to 3 parts (or about 0.0005% to about 0.5% by weight) of ethylene diamine tetraacetic acid is then added and mixed thoroughly. After thorough mixing approximately 12 parts (or about 0.001% to about 15.0% by weight) of a neutralizing agent or alkaline electrolyte such as triethanolamine, a mixture of sodium hydroxide and water, or a dilute mixture of an amine component, is added and mixed until a smooth homogeneous gel results.

In the examples above, cellulose thickeners such as hydroxy ethyl cellulose, hydroxy methyl cellulose, hydroxy propyl cellulose, carboxy methyl cellulose, sodium CMC and other cellulose of a similar nature may be used which function to resist the extraction of water from the mastic. The cross-linked polyacrylic acid significantly lowers the pH of the water and serves as a gelling agent, and other suitable gelling agents may be used. The gelling component also encapsulates the latex binder component. Highly tackafied latex compounds such as butadiene rubber latex, butadiene-styrene, acrylic or a combination thereof may be used. The optional anti-microbial agent prevents microbial degradation in the container and extends shelf life.

Latex and cellulose additives tend to foam in the manufacturing process and in example 2 above the antifoaming agent controls air entrainment in the adhesive. When the mastic adhesive is mixed with a calcium-containing powdered cementitious material such as Portland cement (described below) the antifoaming agent will prevent air entrainment in the cementitious mortar which may otherwise cause a "false set" (the mortar getting crumbly while being troweled). The propylene glycol functions as a coupler to assist in coupling the aqueous phase to the hydrophyllic phase of the other ingredients. It also functions as a cleaning solvent. The ethylene diamine tetraacetic acid is a chelating agent and functions as a binder to bind up the free calcium in the water. It should be understood that the formulation for the gelled mastic adhesive may include one or various combinations of the anti-foaming agents, anti-microbial agents, preservatives, and other additives.

The finished gel mastic adhesive has the consistency of a custard or jelly. The viscosity level of the finished gel may range from about 4,000 to about 200,000 centipoise (typically from about 12,500 to about 200,000 centipoise). Prior to the present invention, combining ordinary conventional mastic adhesives with a Portland cement product was not possible because the conventional mastic adhesives have a very high viscosity in excess of 600,000 centipoise which makes it impossible to add more filler such as a Portland cement.

The formulation of mastic adhesives without using clays and other suspension agents to keep the formulation from separating is believed to be novel. Prior to the present invention, the components of organic "bucket" mastics were commonly held in suspension using high levels of calcium carbonate (usually about 325 mesh) and other additives. Silica sand, dry ground to about 200–300 mesh, and other calciferous products and Wollanstonite (similar to asbestos) were also used. Many of these contribute nothing to the strength and usually detract from the desired characteristics in the final product. Not only are these materials unnecessary to formulate the gelled mastic adhesive of the present invention, they would compromise the formation of the gelatinous structure. When this breakable gelled mastic adhesive has formed, it will remain stable and uniform in consistency for immediate use with no mixing or stirring required upon opening of the container while at the same time resisting drying, setting, and microbial degradation in the container.

The gelled mastic adhesive of the present invention has greater workability than conventional mastic adhesives. It provides an abundance of open time that allows the mechanic the benefit of installing larger areas, and an abundant tack time that gives the slower mechanic some advantage. There is no slip so workmen can set tile from the top level-line down thus allowing the use of less skilled mechanics.

Because the present gelled mastic becomes fluid when a filler such as Portland cement is added, the addition of more Portland cement will give a resultant viscosity sufficient to function as a dry-set mortar thereby supplying the necessary free water for the Portland cement to use in the hydration process and giving the strength expected of a dry-set mortar. Due to the even distribution of water in the matrix, gel-based mastic adhesives of the present invention impart homogeneous water availability, thereby making the necessary water available for the hydration process of the added Portland cement which imparts the required strength to the resultant tile adhesive bond.

GELLED DRY-SET MORTAR PREPARATION

The components of the gelled mastic adhesive examples described above are completely suspended in an aqueous medium by a uniform yet breakable gel. The cross-linked polyacrylic acid gelled water carries the additives in a totally stable manner. It reverts almost instantly to a liquid on contact with the many electrolytes and polyvalent cations such as those present when any calciferous material like Portland cement powder contacts the gel. This allows a mastic-cement combination to be used as a dry-set mortar for installing tile on floors and countertops and thereby imparts to the normally low strength Type I or II mastic adhesive the features and high shear strengths of a premium latex modified dry-set mortar.

EXAMPLE 1

Gelled Dry-set Mortar

To prepare a preferred gelled dry-set mortar using the breakable gel mastic adhesive, approximately equal parts of a powdered calcium-containing cementitious material, such as Portland cement are added to the gel mastic adhesive and thoroughly mixed together. The gel mastic adhesive upon mixing with the powdered calcium-containing cementitious material, breaks upon contact to become a free flowing liquid and serves as the liquid component for hydrating the cementitious material, thereby allowing precise quantitation and easy mixing. After thorough mixing, the mixture forms a homogeneous high-strength latex modified dry-set mortar. The addition of more cementitious powder with additional mixing brings the paste to trowelable consistency like that of traditional dry-set mortars. The finished dry-set mortar thus produced is a homogeneous dry-set mortar with the strength and water resistance of a latex modified Portland cement based composition and also may function as a waterproofing and crack suppressing membrane adhesive. This dry-set mortar meets or exceeds all ANSI A118.1 standards.

In a preferred embodiment, the calcium-containing cementitious material used is a powdered Portland type cement, however, other calcium-containing cementitious materials may be used such as masonry cements, blast furnace slag cements, Portland-pozzolan cement, and aluminous cements.

Mixing the dual function gelled mastic adhesive described in this invention with Portland cement produces a dry-set mortar that has the workability of a good mastic adhesive with the added advantage of not having to carry a number of different products to the job site. Prior to the present invention, any unused portion of mastic adhesives had to be completely used up, or the container virtually perfectly sealed, or the product became unusable. If much air space was left in the containers above any remaining material, it could also spoil. Because the gel efficiently holds water, the gelled mastic adhesive of the present invention has a very long shelf life even if not properly sealed, thus significantly decreasing waste.

Prior to the present invention, mastic adhesives could not be used to install vitreous tile. If such mastic was used, it would dry around the edges and this dry skin would prevent the drying of most of the mastic adhesive behind the tile. Therefore no bond would develop between the tile and the backing material. By simply adding portland cement to the gelled mastic adhesive, such tile can be installed with confidence that drying will occur. The setting in the gelled mastic-portland cement mix is dependent on chemical activity previously described rather than evaporation of the carrier.

When the gelled mastic adhesive described by this invention is mixed with Portland cement for floor and countertop use, or if additional strength is desired in the installation of wall or ceiling tile, the Portland cement sets into an exceedingly strong bond in its normal fashion thus giving the strength of a dry-set mortar. The gel that is used to stabilize the mastic adhesive breaks into a low viscosity liquid when mixed with the Portland cement thus allowing homogeneous mixing while supplying all of the required additives as more Portland cement is added to make a trowelable paste.

While this invention has been described fully and completely with special emphasis upon preferred embodiments, it should be understood that within the scope of the appended claims the invention may be practiced otherwise than as specifically described herein.

What is claimed is:

1. A dual function viscous breakable gel mastic adhesive capable of use as a mastic adhesive and as a base for forming a latex modified dry-set mortar, comprising:

a viscous homogeneous breakable gel mastic adhesive containing a latex compound, a cellulose thickening agent, and at least one property enhancing additive evenly dispersed and suspended therein and having a viscosity level in the range of from about 4,000 to about 200,000 centipoise with the consistency of a custard or jelly;

said gel mastic adhesive functioning as-is as a stable gel mastic adhesive and upon mixing with a powdered calcium-containing cementitious material, breaking to become a free flowing liquid for hydrating the cementitious material and, after mixing therewith, forming a homogeneous high-strength latex modified dry-set mortar.

2. The viscous breakable gel mastic adhesive according to claim 1, wherein said breakable gel mastic adhesive comprises a mixture of:
water;
a cellulose thickening agent;
a latex compound;
a gelling agent in an effective amount sufficient to lower the pH of said water; and
an alkaline electrolyte viscosity increasing agent in an effective amount sufficient to raise the pH and form the mixture into a gel with a viscosity level having the consistency of a custard or jelly.

3. The viscous breakable gel mastic adhesive according to claim 2, wherein the amount of said water is from about 50% to about 95% by weight.

4. The viscous breakable gel mastic adhesive according to claim 2, wherein the amount of said cellulose thickening agent is from about 0.001% to about 15% by weight.

5. The viscous breakable gel mastic adhesive according to claim 2, wherein said cellulose thickening agent is selected from the group consisting of hydroxy ethyl cellulose, hydroxy methyl cellulose, hydroxy propyl cellulose, carboxy methyl cellulose, and sodium CMC.

6. The viscous breakable gel mastic adhesive according to claim 2, wherein the amount of said latex compound is from about 1% to about 75% by weight.

7. The viscous breakable gel mastic adhesive according to claim 2, wherein said latex compound is selected from the group consisting of butadiene rubber latex, butadiene-styrene latex, and acrylic latex compounds.

8. The viscous breakable gel mastic adhesive according to claim 2, wherein said amount of said gelling agent is from about 0.01% to about 15% by weight.

9. The viscous breakable gel mastic adhesive according to claim 2, wherein said gelling agent comprises a cross-linked polyacrylic acid.

10. The viscous breakable gel mastic adhesive according to claim 2, wherein said amount of said alkaline electrolyte is from about 0.001% to about 15% by weight.

11. The viscous breakable gel additive carrier according to claim 2, wherein said alkaline electrolyte comprises a triethanolamine.

12. The viscous breakable gel mastic adhesive according to claim 2, further comprising:

an organic chelating agent in an effective amount sufficient to bind excess ions in said water.

13. The viscous breakable gel mastic adhesive according to claim 12, wherein:

said amount of organic chelating agent is from about 0.0005% to about 0.5% by weight.

14. The viscous breakable gel mastic adhesive according to claim 12, wherein:

said organic chelating agent comprises ethylene diamine tetraacetic acid.

15. The viscous breakable gel mastic adhesive according to claim 2, further comprising:

an anti-microbial agent in an effective amount sufficient to prevent microbial growth in said mixture.

16. The viscous breakable gel mastic according according to claim 2, further comprising:

an anti-foaming agent in an effective amount sufficient to prevent air entrainment in said mixture.

17. The viscous breakable gel mastic according to claim 2, further comprising:

propylene glycol in an effective amount sufficient to facilitate coupling the aqueous phase to the hydrophilic phase of the ingredients in said mixture.

18. The viscous breakable gel mastic according to claim 2, further comprising:

a fungicide preservative in an effective amount sufficient to prevent fungus growth in said mixture.

19. A viscous homogeneous latex modified dry-set mortar formed by the process of:

thoroughly mixing together approximately equal parts of a powdered calcium-containing cementitious material and a viscous homogeneous breakable gel mastic adhesive; wherein said viscous homogeneous breakable gel mastic adhesive contains a latex compound, a cellulose thickening agent, and at least one property enhancing additive evenly dispersed and suspended therein and having a viscosity level in the range of from about 4,000 to about 200,000 centipoise with the consistency of a custard or jelly; and said gel mastic adhesive upon mixing with a powdered calcium-containing cementitious material, breaking to become a free flowing liquid for hydrating the cementitious material and, after mixing therewith, forming a homogeneous high-strength latex modified dry-set mortar.

20. The viscous homogeneous latex modified dry-set mortar according to claim 19, wherein said calcium-containing cementitious material is selected from the group consisting of Portland type cements, masonry cements, blast furnace slag cements, Portland-pozzolan cement, and aluminous cements.

* * * * *